United States Patent
Huang

[11] Patent Number: 5,851,568
[45] Date of Patent: Dec. 22, 1998

[54] HEX-DIRECTIONAL PRESS FOR CONSOLIDATING POWDERED MATERIALS

[76] Inventor: Xiaodi Huang, 406 2nd St., Houghton, Mich. 49931

[21] Appl. No.: 674,526

[22] Filed: Jul. 2, 1996

Related U.S. Application Data

[62] Division of Ser. No. 512,221, Aug. 7, 1995.

[51] Int. Cl.$^6$ .................................................. B29C 43/10
[52] U.S. Cl. ........................... 425/356; 425/77; 425/330; 425/405.2
[58] Field of Search .............................. 425/330, 77, 356, 425/405.1, 405.2

[56] References Cited

U.S. PATENT DOCUMENTS

| | | | |
|---|---|---|---|
| 2,449,008 | 9/1948 | Pecker et al. | 425/356 |
| 2,499,530 | 3/1950 | Scott | 425/356 |
| 3,584,336 | 6/1971 | Von Platen | 425/77 |
| 3,809,736 | 5/1974 | Munk | 425/356 |
| 4,559,195 | 12/1985 | Heggenstaller | 264/113 |
| 5,100,601 | 3/1992 | Heggenstaller | 264/113 |

*Primary Examiner*—James P. Mackey
*Attorney, Agent, or Firm*—Watson Cole Grindle Watson, P.L.L.C.

[57] ABSTRACT

A method for consolidating powdered material to near net shape and full density is provided. The method includes the steps of: mixing a particulate material with an organic or inorganic binder to form a mold material; shaping the mold material into a mold having a shape and including an external surface and an interior cavity and being of sufficient solidity to maintain its shape yet being compressible under pressure; filling the interior cavity with a powdered material to be consolidated; heating the mold with the powdered material therein to form a heated filled mold; applying pressure to the external surface of the mold sufficient to compress the mold material and transfer a pressurizing force to the powdered material within the mold cavity so as to consolidate the powder and form an article; and removing the article from the mold. In an alternative method, the mold material is made of a particulate material which is held in the shape of the mold by a vacuum.

1 Claim, 12 Drawing Sheets

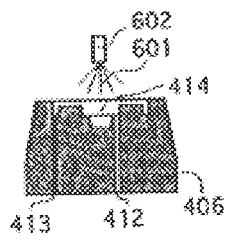
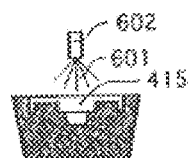
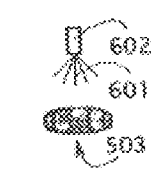
Fig. 1(k)  Fig. 1(l)  Fig. 1(m)
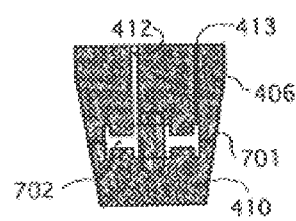
Fig. 1(n)
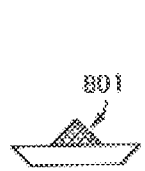 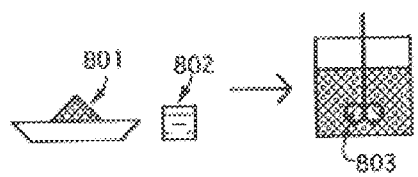 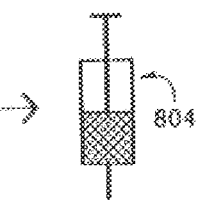
Fig. 1(o)  Fig. 1(p)  Fig. 1(q)
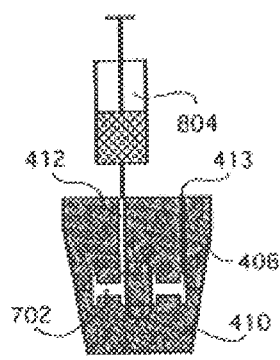
Fig. 1(r)

HEX-DIRECTIONAL PRESS FOR CONSOLIDATING POWDERED MATERIALS

This application is a divisional application of application Ser. No. 08/512,221, filed Aug. 7, 1995.

FIELD OF THE INVENTION

The present invention relates to a hot isostatic pressing method used for manufacturing metallic, intermetallic, ceramic, composite, hybrid, and coated articles from powdered materials. More particularly, the invention relates to a method which results in articles with simple or complex geometry which have net or near-net shape, and zero or near-zero porosity.

BACKGROUND OF THE INVENTION

It is well known that articles with complex shapes may be produced by casting or powder metallurgy. The specific method used depends on the material of the article and other considerations. In metal casting, a sand mold is first produced with a desired cavity shape. Metal is melted and cast into the mold. After solidification and separation from the sand, a metal article is produced. One advantage of metal casting is that it is inexpensive and capable of producing products of various shapes and sizes in either high or low volume production. The limitation of using metal casting is its applicability only to materials with relatively low melting points and good castability.

Powder metallurgy (PM) is a method used to produce articles from powdered materials. Powder metallurgy was originally developed because there were no means to melt metal materials with high melting points. Modern powder metallurgy has been developed to offer many advantages which cannot be attained by any other metalworking processes. These advantages include (a) precise production control; (b) applicability to various composites; (c) unusual physical and mechanical properties; (d) reduced machining and finishing; (e) less material usage; and (f) good reproducibility.

Since PM articles are made of powdered materials, it is naturally desired, in most cases, to eliminate all voids between particles during the consolidation process. This is important to ensure good mechanical properties, especially to those advanced and void sensitive materials such as ceramic, intermetallic materials, and their composites. One way to achieve zero or near zero porosity of PM articles is to use the hot isostatic pressing technique (HIP).

Prior art isostatic pressing techniques present certain problems and disadvantages. Solid particles have been employed as a pressure transmitting medium, but it is difficult to achieve an isostatic or pseudo-isostatic pressing environment in a press with such particles. In addition, when solid particles are so employed, it is difficult to separate the molded article from the pressure transmitting medium. This separation is critical when molding ceramic articles because ceramic materials are brittle and it may not be feasible to shake or shock such materials.

SUMMARY OF THE INVENTION

It is an object of the present invention to utilize particulates mixed with binders as both pressure transmitting and molding media. According to the invention, a pattern is prepared and then a mixture of particulates and binder is charged over it to produce a mold with the desired cavity, after the binder is cured. A powdered material is fed into the cavity to form the article geometry. The mold serves as a pressure transmitting medium during the consolidation process.

After feeding a powdered material into the mold cavity, the strength of the mold can be lost by debinding if a container is used to maintain the mold shape. It is therefore preferable to heat the mold with powdered material to be consolidated in the cavity. The mold and powdered material is heated selectively or homogeneously by an induction, resistance, gas, oil, or microwave furnace. Reactions between different powders can be controlled be providing atmospheres including organic and inorganic vapor, so as to synthesize, in situ, new materials during heating. After completion of heating, the mold is quickly transferred into a special die on which a thermal insulation and lubrication coating is preferably applied.

The present invention offers several combinations of mold external geometries, internal geometries of pressing dies, and pressing systems, which can achieve a pseudo-isostatic pressing environment.

According to the present invention, a preform is transferred into a pressing die with the mold surrounding it. Therefore, the mold can serve as a thermal insulator, or even a heater if an exothermal reaction occurs within the mold material. An adjacent atmosphere of powdered materials is controllable by additives in the mold. The molds and cores may also serve as a pressure transmitting medium, thermal reservoir, heat transmitting medium, and liquid absorber with or without the assistance of solid or liquid additives.

The present invention solves the problem of separation of molded ceramic articles from the pressure transmitting medium since the invention uses special molding media which are readily collapsed with simple treatment.

The present invention solves problems encountered in feeding dry powdered materials into complex cavities by providing a wet powder feeding, in which the powders can be fed to everywhere in a cavity, and the porous mold can then absorb the liquid vehicle to accelerate drying.

The major advantages of the present invention are: (1) great flexibility, (2) high product quality, (3) high production rate, (4) competitive production cost, and (5) capability of consolidating powdered materials at very high temperatures (over 3000° C.) and pressures (over 1.5 GPa).

BRIEF DESCRIPTION OF THE DRAWINGS

The present invention may be more fully understood with reference to the accompanying drawings, wherein.

DETAILED DESCRIPTION OF THE INVENTION

Figure 1A:
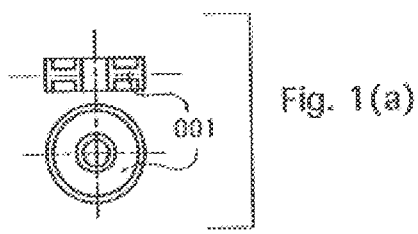
FIGS. 1(a)–(z) illustrate a typical set of process steps involved in a method according to the present invention.
Figure 1B:
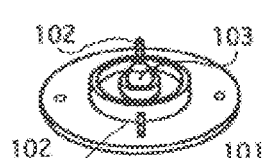
Figure 1C:
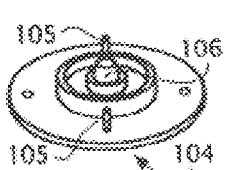
Figure 1D:
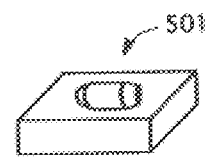

FIG. 1 illustrates a typical sequence of steps comprising a method of the present invention. As shown in FIG. 1(a), the method starts with a blue print 001 of an article comprising a wheel to be produced from a powdered material or a mixture of powdered materials. FIG. 1(b) shows a plate pattern 101 having positioning pins 102 and a core projection 103 for making a mold cope 406 as shown in FIG. 1(k). FIG. 1(c) shows a plate pattern 104 having positioning pins 105 and a core projection 106 for making a mold drag 410 as shown in FIG. 1(l). Plate patterns 101 and 104 are made in accordance with the blueprint 001. FIG. 1(d) shows a core box 501 for making a half core 502, as shown in FIG. 1(i), which constitutes part of the mold.

Figure 1E:
Figure 1F:
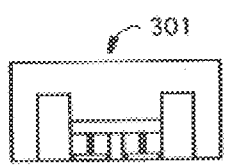

The precursor materials for the mold comprise particulates 201 and a liquid binder 202 as shown in FIG. 1(e). FIG. 1(f) discloses a muller mixer 301 which is used to mix the particulates 201 and binder 202 together.

Figure 1G:
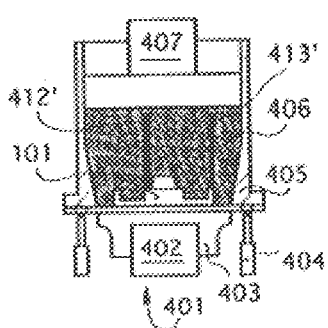
Figure 1H:
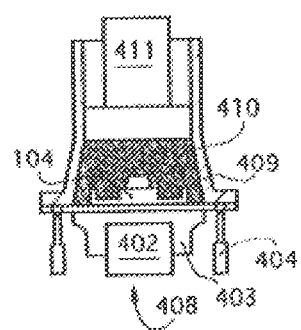

FIGS. 1(g) and 1(h) illustrate a method of forming of the mold. cope 406 and mold drag 410 by using jolt squeeze molding machines 401 and 408, respectively. As shown in FIG. 1(g), the jolt squeezing machine includes: a punch 407 for applying pressure and compacting the mold material; a die or flask 405 for making a cope 406; an anvil 403 for supporting the pattern 101, mold material and flask; a ram-jolt piston 402 for the anvil; and injection cylinders 404 for separating the mold 406 from the pattern 101. The positioning pins 102 of pattern 101 fit into complementary holes formed in the bottom of the die or flask 405 and align the pattern and die with one another. Rods 412' and 413' are placed on pattern 101 at locations where it is desired to have a sprue and a vent hole, respectively, in the finished cope.

Likewise, FIG. 1(h) shows a jolt squeezing machine which includes a punch 411 for applying pressure and compacting the mold material; a die or flask 409 for making a drag 410; an anvil 403 for supporting the pattern 104, mold material and flask; a ram-jolt: piston 402 for the anvil; and injection cylinders 404 for separating the mold 410 from the pattern 104. The positioning pins 105 of pattern 104 fit into complementary holes formed in the bottom of the die or flask 409 and align the pattern and die with one another. As punches 407 and 411, respectively, compact the mold materials under pressure, the cope and drag are formed. Holes (not labelled) are provided in the patterns 101 and 104 to receive injection nozzles from cylinders 404.

Figure 1I:
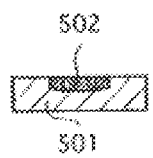
Figure 1J:

FIG. 1(i) shows a cross section of a core box 501 with a half core 502 inside, ready to be stripped from the box. The core is made out of the same or different molding material. In one embodiment, a less compressible material is used for the core than for the mold cope and drag. Core material is heaped into the cavity of the core box and compressed or rammed into the cavity by a press or ram to make a half-core. In one embodiment, the mixture of sand and binder is fed into the core half box 501, rammed, and scraped down with a tool. The half-core is then stripped from the core box by shaking, shocking, scraping tools, or by other suitable methods. Two half-cores are then bounded together with a binder to form a whole core. FIG. 1(j) shows two half cores which have been bonded together to form a one piece core 503.

FIGS. 1(k) and 1(l) show the cope 406 and drag 410, after being stripped from the dies 405 and 409, respectively. Patterns 101 and 104 have been removed from the cope and drag, respectively, leaving cavities 414 and 415 therewithin. Passageways 412 and 413 are formed in the cope 406 for the purposes of powder filling and air venting, respectively. Passageways 412 and 413, and similarly sprue 416 (shown in FIG. 4), are formed during the mold forming steps shown in FIGS. 1(g) and 1(h). Bars or rods are placed in desired positions to act as passageway patterns. After mold formation, the rods 412' and 413' are removed from the cope to leave sprue 412 and vent hole 413 in the finished cope. Cavities 414 and 415 are coated with a slurry 601 using a sprayer 602.

FIG. 1(m) shows the coating being sprayed on the core surface. FIG. 1(n) shows the assembled mold with a cope and a drag, forming cavity 702 having the same shape as the wheel 001 but an enlarged size to compensate for later consolidation shrinkage. The cope and drag are assembled together by a binder applied on the contact surface 701 or by mechanical means. During powder feeding it is necessary to keep the cope and drag held tightly together. After feeding is complete, less holding force is required. For temporary tight holding, a weight on the cope may be used or a clamp may be used to hold the cope and drag together. Alternatively, clamps inserted within the cope and drag can be used to hold them together.

FIG. 1(o) represents both the powdered material 801 to be used for manufacturing the wheel 001, and a selected carrying liquid 802. The liquid facilitates feeding of the powdered material 801 into, e.g., the cavity 702 shown in FIG. 1(n). Although the powdered material can be fed in wet or dry form, FIG. 1(p) represents preparation of a wet form by mixing the powdered material 801 with the liquid 802 using a blender 803. FIG. 1(q) shows an injector 804 charged with mixture of powder and liquid. FIG. 1(r) illustrates a wet feeding of the mixture into cavity 702 through passage 412 using injector 804. Air is vented through the venting passage 413 when the wet mixture occupies cavity 702. Due to the porous nature of the mold material, liquid may be sucked into or absorbed by the surrounding mold material to concentrate the powdered material to be consolidated and promote drying.

Figure 1S:
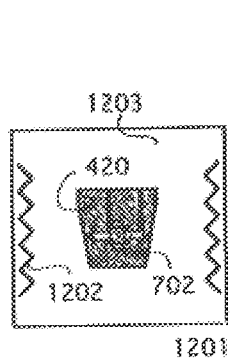
Figure 1T:
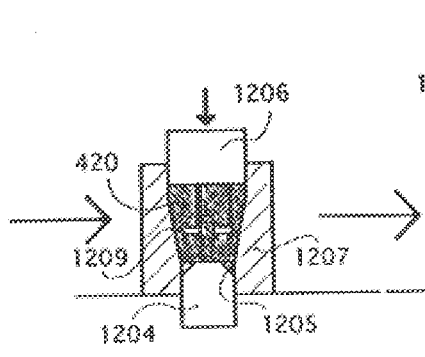
Figure 1U:
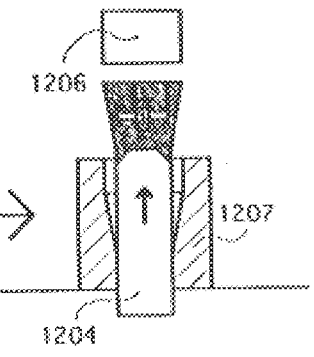
Figure 1V:
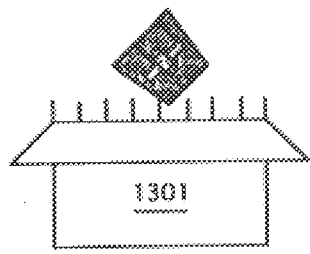
Figure 1W:
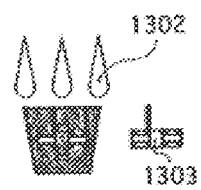
Figure 1X:
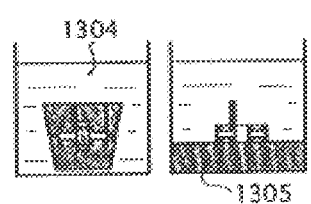
Figure 1Y:
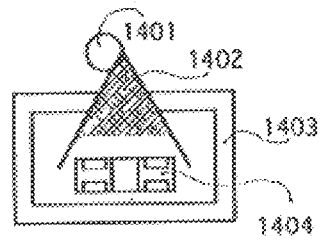

FIG. 1(s) illustrates the step of heating the mold to heat, degas and debind the powdered material. Heating can be performed in an induction or resistance furnace. The furnace 1201 includes an induction coil or heating elements 1202. The interior of the furnace may contain a vacuum, an inert gas atmosphere, or air.

The powdered material in the cavity 702, if it is metallic, can be selectively heated by induction current generated by an induction coil 1202. If the whole or partial mold of pressure transmitting medium is made of graphite or metal, the mold can be heated by induction current; otherwise, the mold is heated in a different type of furnace.

The heated mold is then removed from the furnace and transferred from the furnace 1201 of FIG. 1(*s*) into the single taper die 1207 shown in FIG. 1(*t*) having a lubricant and thermal insulation coating on the inner surface thereof. The mold 420 is compressed by the top punch 1206. The bottom punch 1204 defines an annular free space 1205 into which a portion of the pressure transmitting medium of the mold may flow. The purpose of the space is to allow the whole mold to be able to move down, and the side surface 1209 causes compaction of the mold material thereby causing consolidation of the powdered material within the mold cavity.

The mold body transfers the pressure pseudo-isostatically on the powdered material to consolidate the material into a fully dense article at an elevated temperature.

FIG. 1(*u*) shows the mold of pressure transmitting medium, after compression, ejected out of the die by the bottom punch 1204. FIG. 1(*v*) represents the mold of pressure transmitting medium, after consolidation, placed on a shakeout device 1301 to separate the article from the medium. FIG. 1(*w*) represents a separation method by burning as represented by flames 1302. Burning can be used if the mold comprises combustible material. Only enough burning of the mold to easily collapse it is necessary.

FIG. 1(*x*) represents a separation method by immersing a mold/pressure transmitting medium into water 1304. The mold/pressure transmitting medium was initially made of $CaCO_3$ and become CaO after decomposition of $CaCO_3$ at about 900° C. The CaO mold reacts with water to form CaOH 1305 which will lose strength.

FIG. 1(*y*) shows a surface cleaning method by sand blasting in a chamber 1403. A nozzle or centrifugal wheel 1401 and an abrasive sand or steel shot 1402 are provided. FIG. 1(*z*) represents a reclamation of mold medium 1501 by re-classification using a screen 1502. Screened material 1503 has passed through the screen 1502.

Figure 2:
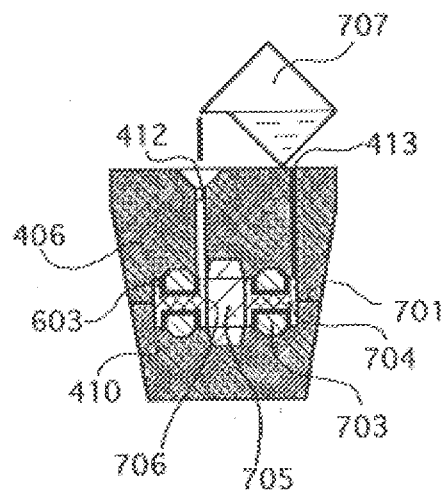
FIG. 2 illustrates a mold according to the present invention comprising a cope and drag, along with a method of filling the mold with a material to be consolidated.

FIG. 2 illustrates another embodiment of the present invention wherein a fiber preform 704 is used for producing a fiber reinforced article. First, the preform 704 is placed in the cavity of the mold. A slurry 707 containing matrix material powder is poured into the cavity through a passageway 412. The slurry is of a viscosity which allows it to flow freely between fibers and fill the spaces between fibers. After drying and consolidation, a fiber reinforced article results. As shown in FIG. 2, another solid or a powdered preform 705 can be diffusely bonded to the preform 704. To promote bonding, the bonding surface 706 of the preform 705 is first cleaned. In addition, one or more inserts 703 comprising a solid material which is preferably non-compressible can be inserted in the mold and used in conjunction with the mold to provide a molded article having good surface finish and accurate dimensions. For example, if it is desired to produce an article having an opening therein of a specific diameter, an insert having an outer diameter of the desired resultant diameter can be positioned in the mold to form the opening and prevent consolidated material in the mold from compressing to a smaller diameter opening.

In another embodiment, the insert 703 is made of the same powder material as that of the body 704, such that the same shrinkage rate is achieved for the insert and the powdered body, thus avoiding potential cracks during consolidation. An isolation coating 603 is provided on the preform 703 to prevent the direct contact between the preform and the insert.

Figure 3:
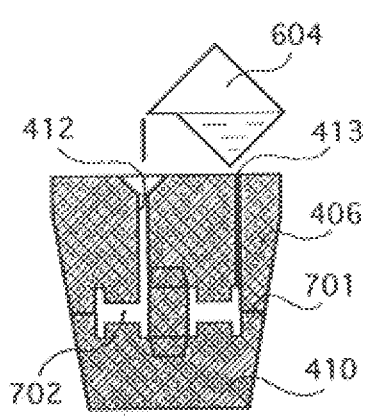
FIGS. 3(a)–(c) illustrate a method to produce an article according to the present invention which has a coating thereon.
Figure 3:
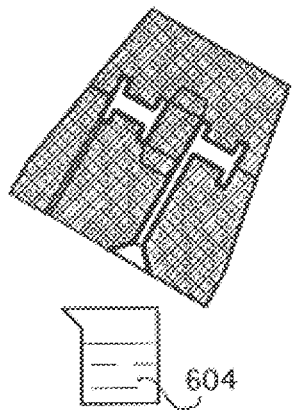
Figure 3:
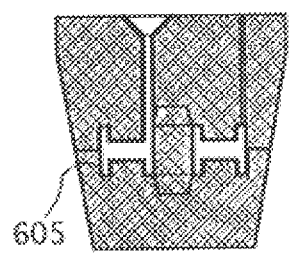

FIGS. 3(*a*)–(*c*) show a way to produce an article having a coating made of a coating material 604. The coating material comprises a powder mixed with binder and liquid to form a slurry of coating material 604. The slurry is poured (FIG. 3(*a*)) and drained (FIG. 3(*b*)) to generate a coating 605 on the mold cavity surface. If desired, multi-layer coatings of the same or different materials can be applied by repeating the above operations. Powder to be consolidated is then fed into the cavity. After degassing and debinding, the powder is then consolidated at an elevated temperature and under high pressure such that the powder and the coating material bond together.

Figure 4:
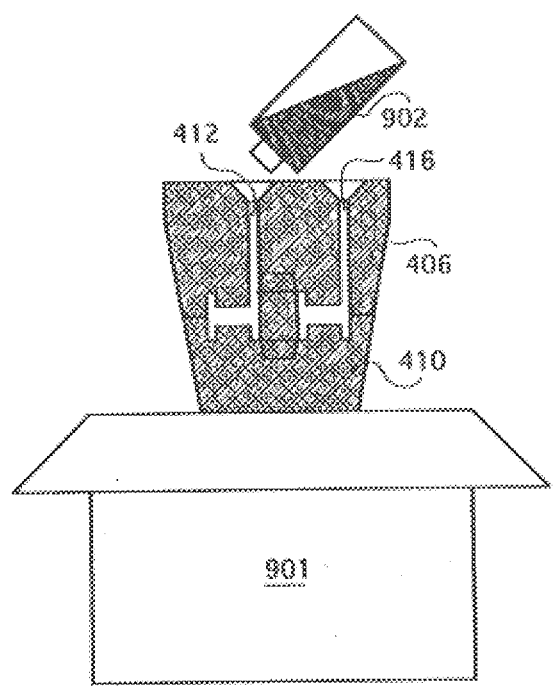
FIG. 4 illustrates a method of dry feeding a powder to be consolidated into a mold according to the present invention.

FIG. 4 illustrates a method of dry feeding powder 902 to be consolidated into a mold of the present invention. Passageways 412 and 416 in the form of sprues are each provided for feeding powder and venting gas displaced by the powder. The funnel shape at the open end of the sprues are formed by scraping out the mold material with a tool or by the shape of the passageway patterns. A vibrator 901 is used to vibrate the mold during powder feeding for assisting powder flow and packing the powder.

Figure 5A:
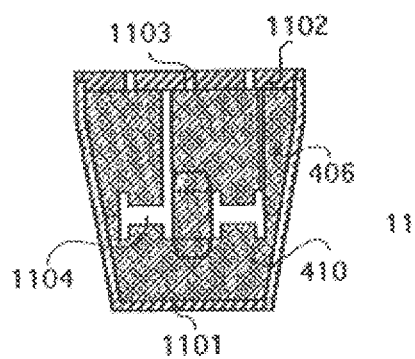
FIGS. 5(a)–(c) illustrate molds of pressure transmitting medium according to various embodiments of the present invention.
Figure 5B:
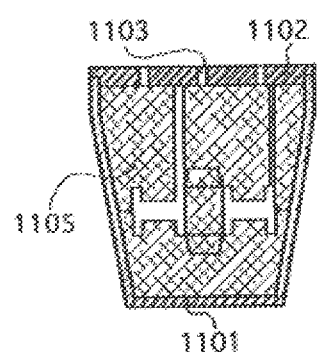
Figure 5C:
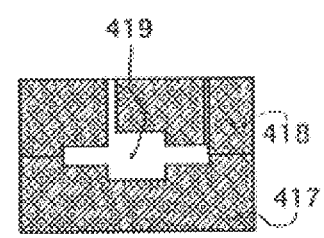

FIGS. 5(*a*)–(*b*) show a mold of pressure transmitting medium bonded by an organic binder with the powder 1104 inside of the cavity. The mold comprises a cope 406 and drag 410. The mold is made of a particulate material and organic binder. Powder 1104 to be consolidated has been fed into the mold cavity and takes the form of a powder body. The mold is disposed within a can 1101 made of a graphite, ceramic or metallic material. The can 1101 includes a cover 1102 having venting holes 1103 therein. After degassing and debinding the mold material, the mold becomes a package of loose particulates 1105 but its shape remains unchanged as does the shape of the powder body inside. The powder is then consolidated in an appropriate manner.

The powder used in the embodiments of FIGS. 5(*a*) and 5(*b*) can be consolidated by either high temperature pressing or pressureless sintering. Pressure can be applied by mechanical means or as gas pressure. After decomposition of organic binder at the elevated temperature, the mold material of FIG. 5(*a*) becomes a package of loose particulates as shown in FIG. 5(*b*). The heated can with the powder inside is then quickly transferred into a die and compressed, in a similar fashion as shown in FIGS. 1(*s*), 1(*t*), and 1(*u*). During compression, the cover 1102 and the can 1101 are destroyed by pressure. In some situations, the cover 1102 is not required as the can 1101 holds the particulates in a desired shape with or without the cover.

If gas pressure is used, the entire loaded can shown in FIG. 5(*a*) is heated in a regular hot isostatic pressing unit under vacuum. When the temperature within the unit is high enough and held for a long enough time, the powdered body inside the mold cavity is sintered to near full density, i.e., remaining voids are isolated. High pressure gas is then introduced to the unit and applied on the external surfaces of the powdered body. The powdered body within the mold cavity is thus consolidated to high density and the can remains in tact.

FIG. 5(*c*) shows a permanent mold assembled from a cope 418 and a drag 417, and having powder 419 loaded inside. The permanent mold can be made of graphite, ceramic or metallic particulates bonded with an inorganic binder. The powder is consolidated by heating the permanent mold in a furnace. The mold can be reused many times.

Mechanical force is not applied to the permanent mold of FIG. 5(*c*). The powder inside is instead consolidated by pressureless sintering, or by gas pressure sintering in a regular hot isostatic pressing unit in the same manner discussed above with respect to FIGS. 5(a) and 5(b). During pressureless or gas pressure sintering of an article in a permanent mold, the permanent mold halves 417 and 418 can be held together by organic binder or simply by the weight of cope 418 resting on drag 417 within a hot isostatic pressing unit. Pressureless sintering is based on the tendency of fine particles which have high surface energies to reduce their collective surface energy by consolidating to form larger particles.

FIGS. 6(a) and 6(b) schematically illustrate the homogeneous compaction of a mold of pressure transmitting medium 420 using a single taper die 1207. During compaction of the mold material, a top punch 1206 of the die travels down a distance $Tr_p$. As the top punch moves down, a portion of the mold enters into a space 1205 provided in the bottom portion of the die cavity thus enabling the whole mold 420 to travel down in the vertical direction $Tr_v$ and to travel at a sliding direction $Tr_B$. The surfaces 1208 of the single taper die are coated with a lubricant and thermal insulation material. The bottom punch 1204 remains still during the compaction process. The resulting contraction from the top to the center is $C_{t-c}$, from the bottom to the center is $C_{b-c}$, from the left side to the center is $C_{ls-c}$, and from the right side to the center is $C_{rs-c}$. The vertical contraction rate is calculated according to the formula:

$$C_v\% = (C_{t-c} + C_{b-c})/h$$

and the transversal contraction rate is:

$$C_{ti}\% = 2 \times C_{ls-c} D_i = 2 \times Tr_v \times \sin \alpha / D_i$$

where h: initial height of the mold of pressure transmitting medium

α: half taper angle $p_i$: diameter at the cross section i

Proper mold and die design can make the vertical and transversal contraction rates the same or very close.

Figure 7A:
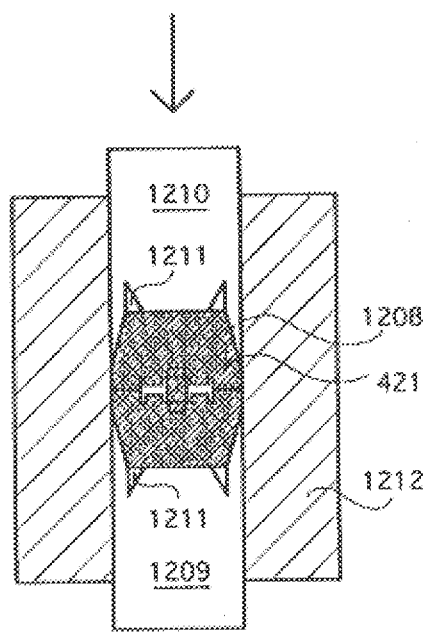
FIGS. 7(a)–(d) illustrate various compaction processes according to the present invention and the resultant compaction vectors.

FIG. 7(a) shows a pseudo-isostatic compaction technique using a dual directional pressing. A specially shaped mold of pressure transmitting medium 421 is placed into a die 1212. A top punch 1210 is used to exert pressure on the top of the mold. A bottom punch 1209 has the same shape as the top punch but exerts a pressure on the bottom of the mold. Channels 1211 are provided to allow a portion of the mold to enter as it is deformed under pressure. The result is a relative movement between the mold of pressure transmitting medium and the special shape of the punch, thus providing side compaction of the mold.

Figure 7B:
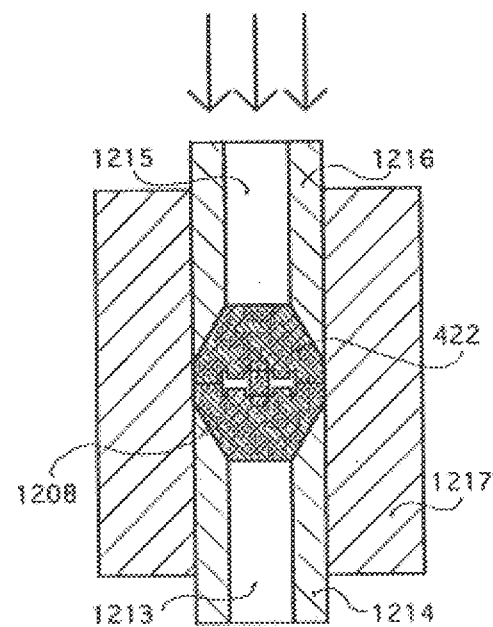
Figure 7C:
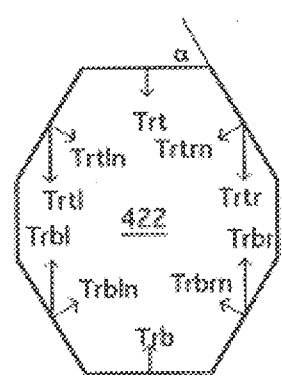
Figure 7D:
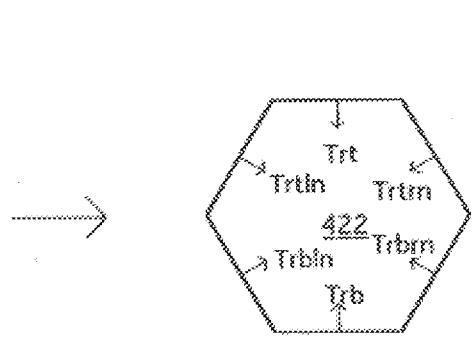

FIG. 7(b) shows another dual directional pressing technique. A die 1217 is provided in combination with a top cylindrical punch 1215, a top tube punch 1216, a bottom cylindrical punch 1213, and a bottom tube punch 1214. During compaction of the mold 422, the two cylindrical punches 1213, 1215 travel at the same speed toward each other. The two tube punches 1214, 1216 also travel at the same speed relative to one another, but the tube punches travel faster than the cylindrical punches. The resultant travel speeds in the directions $Tr_{trn}$, $Tr_t$, $Tr_{tln}$, $Tr_{bln}$, $Tr_b$, and $Tr_{brn}$ are the same or close. FIG. 7(c) shows the beginning shape of the mold of pressure transmitting medium 422 before compaction, and the notations of the various travelling variables. FIG. 7(d) shows the final shape of the mold 422 after compaction of the mold and the final relative travel speeds and directions of the applied compaction force. The travel speed of the side surfaces at normal directions to the surfaces is equal to:

$$Tr_{trn} = Tr_{tr} \times \sin \alpha$$

where $Tr_{trn}$: travel speed of the top right surface in the normal direction $Tr_{tr}$: travel speed of the top right surface in the vertical direction α: angle shown in FIG. 7(c).

The design principle is to make $Tr_t$ and $Tr_b$, the travel speeds of the top and bottom surfaces, equal to $Tr_{tln}$, $Tr_{trn}$, $Tr_{bln}$ and $Tr_{brn}$, the travel speeds of the top and bottom, left and right surfaces, respectively, in the normal directions.

Figure 8A:
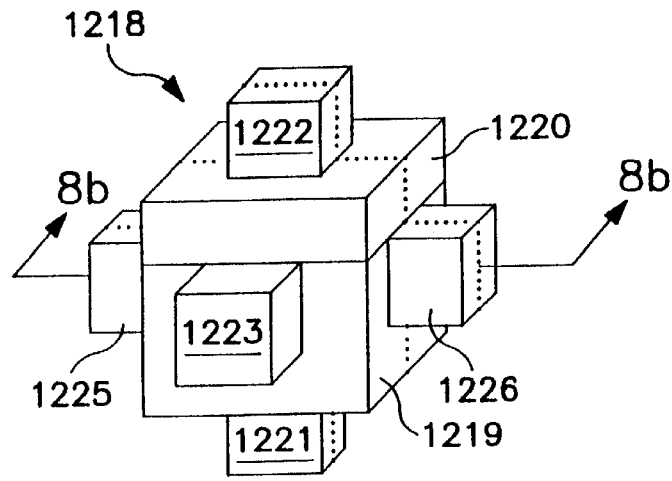
FIGS. 8(a) illustrates a pseudo-isostatic pressing system according to the present inventions.

FIG. 8(a) shows a pseudo-isostatic pressing system 1218 having a cover 1220, a die body 1219, and six punches 1221–1226 which are symmetrically arranged. Punch 1224 opposes punch 1223 and cannot be seen in the Figs. The cover 1220 and the top punch 1222 can be moved away from the die body to accept a mold of pressure transmitting medium in the press cavity.

Figure 8B:
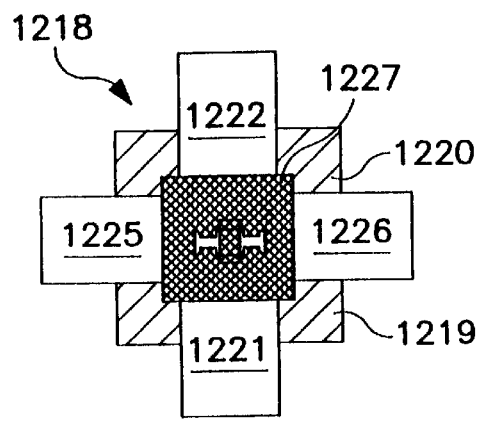
FIGS. 8(b) is a cross-section taken along line 8b—8b of the system of FIG. 8(a)

FIG. 8(b) is a cross sectional view of the system of FIG. 8(a) taken along line 8b—8b of FIG. 8(a). During compaction of the mold, the six punches 1221–1226 move at the same speed toward the mold to compress the mold 1227 isostatically or pseudo-isostatically.

Figure 8C:
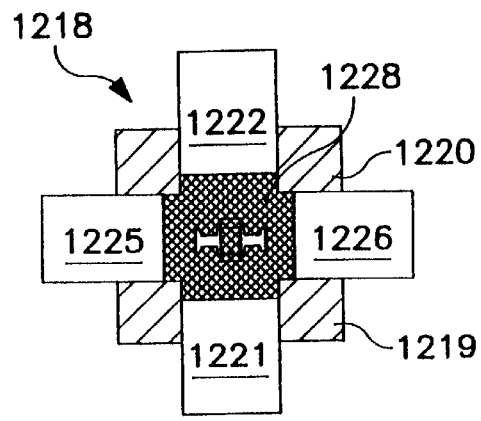
FIGS. 8(c) illustrates another pseudo-isostatic pressing system according to the present invention.

FIG. 8(c) shows an alternative six punch pressing system. The mold of pressure transmitting medium 1228 is shaped as a cubic with six short arms. The isostatic, or pseudo-isostatic compaction is performed by pressing the six short arms of the mold.

Figure 9A:
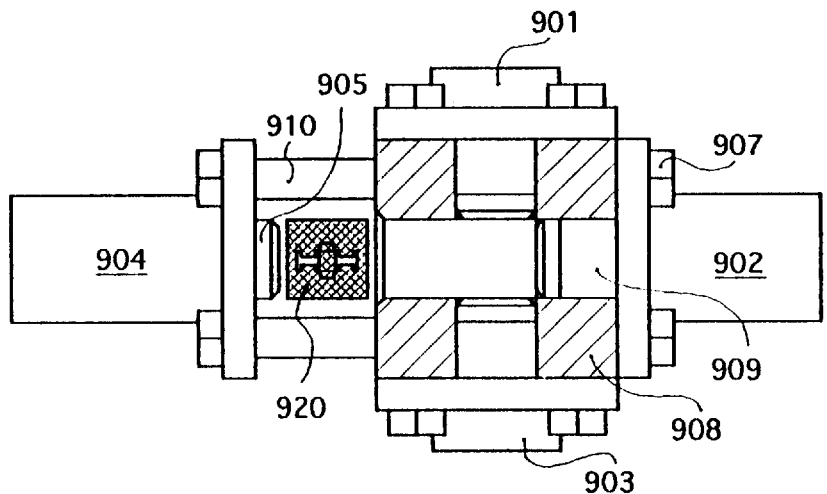
FIGS. 9(a)–(c) show a structure of a hex-directional pressing system according to the present invention with means for loading and unloading a mold according to the invention.
Figure 9B:
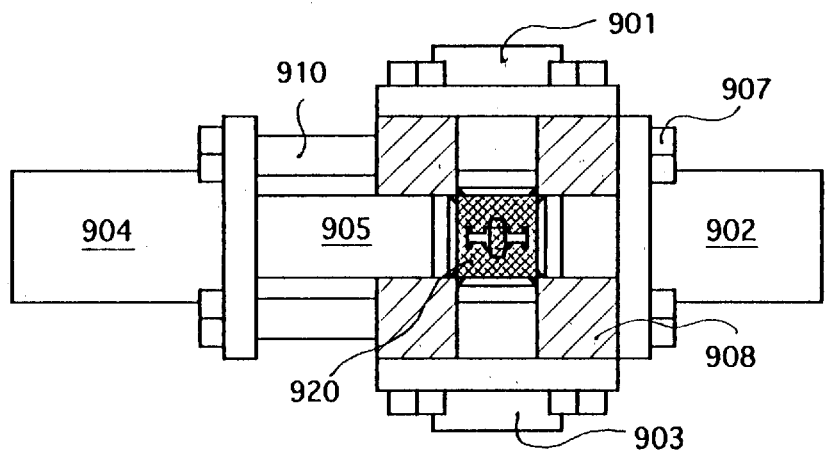
Figure 9C:
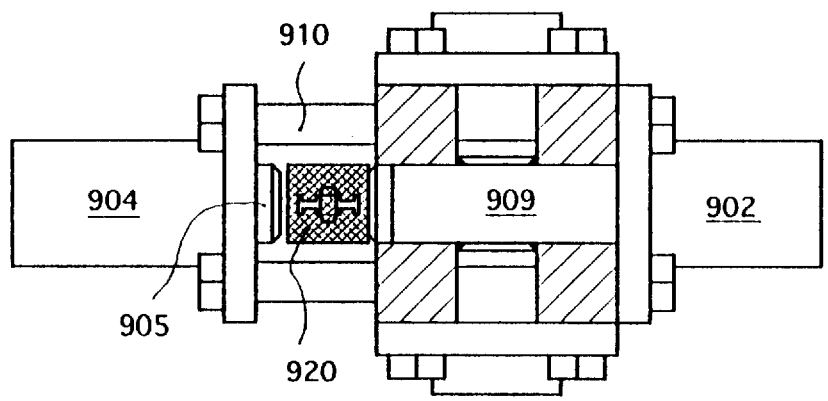

FIGS. 9(a)–(c) show a typical structure of a hex-directional press with means suited for loading and unloading a mold. The press consists of cylinders 901, 902, 903, 904, and two other cylinders perpendicularly situated and not shown, one in the front and one in the back. The cylinders can be driven by hydraulic pressure, or compressed air if impact forging is desired. A connection bolt 907 secures a cylinder 902 to a single piece die 908, as does a connection bar 910. A cylinder punch 909 with a square head is operatively connected to the cylinder 902. FIG. 9(a) shows the position of a mold 920 which has been transported from a furnace to the position by a conveyor or a pushing cylinder. The mold is then pushed by a cylinder punch 905 by actuating cylinder 904, into the die in a ready pressing position shown in FIG. 9(b). After pressing, cylinder 904 retracts and cylinder 902 is actuated to push the mold out of the die and into position for a conveyer or a pushing cylinder to transport the compressed mold away, as shown in FIG. 9(c).

Figure 10A:
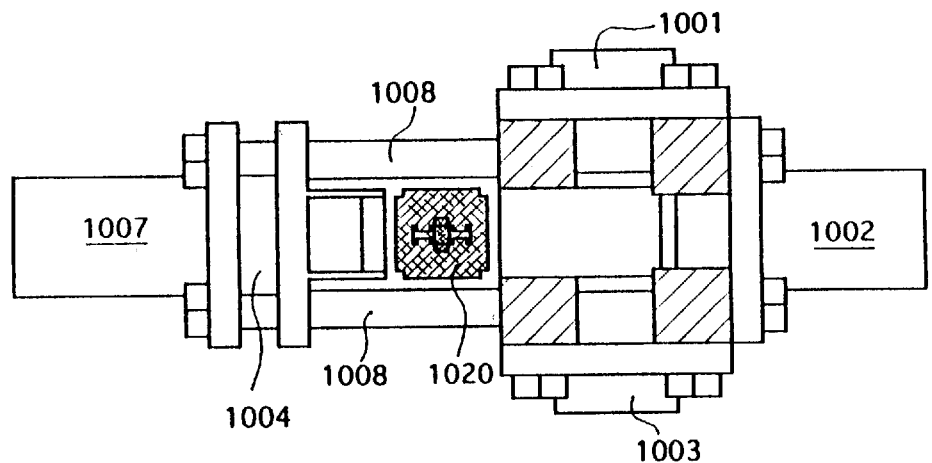
FIGS. 10(a)–(b) show the structure of a hex-directional press having six short arms and used in accordance with a method of the present invention.
Figure 10B:
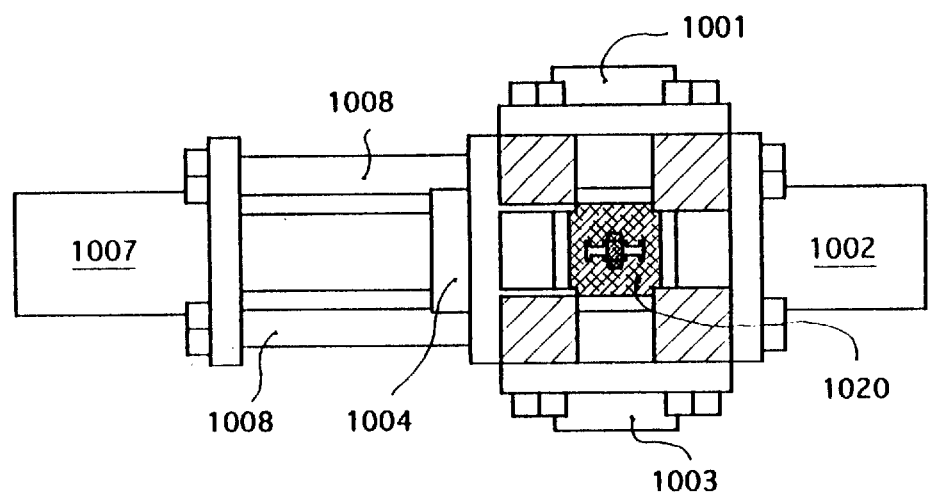

FIGS. 10(a) and 10(b) show a hex-directional press for pressing a mold 1020 having six short arms. The press consists of six main cylinders 1001, 1002, 1003, 1004, and two others not shown, for pressing a mold. An auxiliary cylinder 1007 is also provided for opening and closing the die. There are four connection bars 1008, two of which are shown, which also serve as slide guiding bars for cylinder 1004. Cylinder 1004 and 1007 are connected together. FIG. 10(a) shows the position of a mold 1020 to be inserted into the die and FIG. 10(b) shows the mold 1020 in the ready pressing position.

Figure 11A:
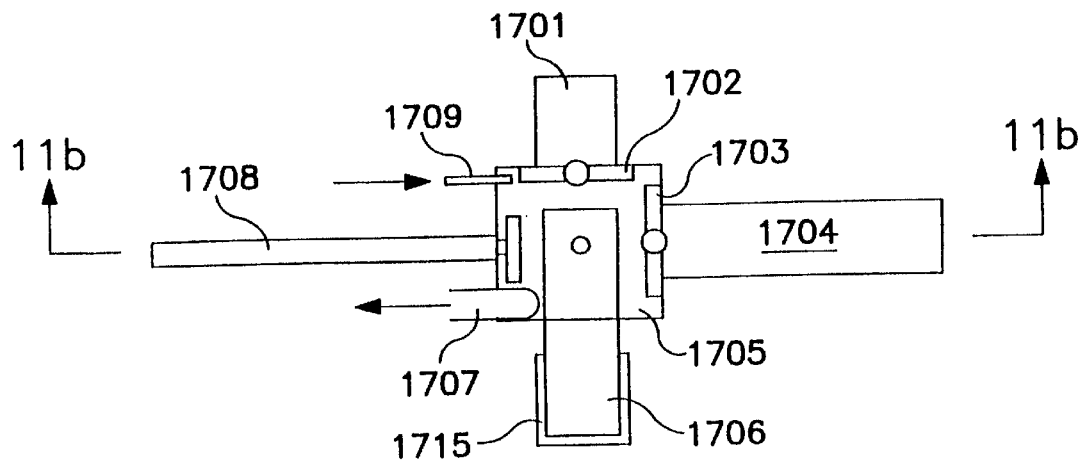
FIGS. 11(a)–(c) show an induction heating apparatus used in conjunction with a method of the present invention.
Figure 11B:
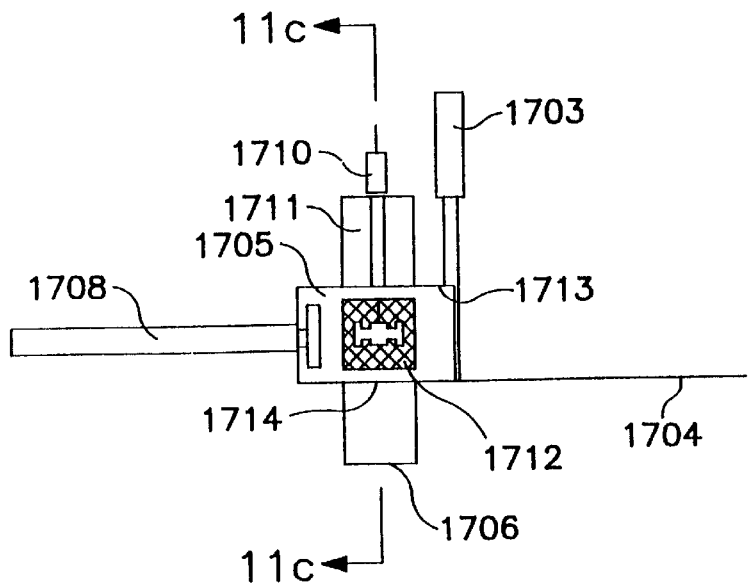
Figure 11C:
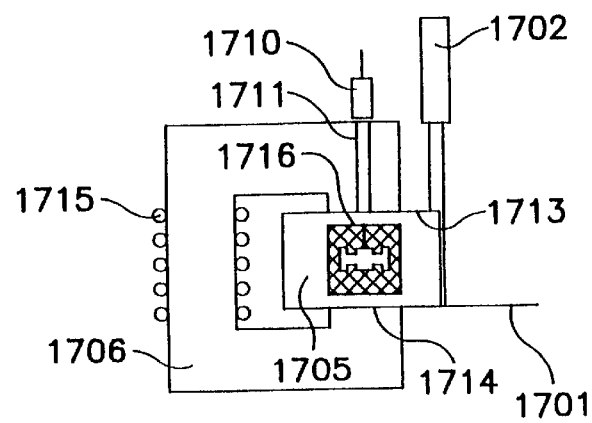

FIGS. 11(a)–(c) show an alternative induction heating furnace which can be used in the methods of the present invention to overcome drawbacks of the prior art. According to the present invention, a metal article or metal powdered body surrounded by a mold of the invention cannot be efficiently heated in a conventional induction heat furnace. This is because gaps between the article and the copper heating coils of the furnace cannot be minimized due to the mold surrounding the article. The furnace of FIGS. 11(a)–(c) overcome this problem.

FIG. 11(a) is a novel induction heating furnace according to an embodiment of the present invention. FIG. 11(b) is a cross-sectional view taken along lines 11b—11b of FIG. 11(a). FIG. 11(b) shows a mold with a metal powdered body or solid piece 1712 therein. The body or piece 1712 within the mold is placed between the upper and lower poles of a C-shaped magnetic concentrator 1706 and supported by a bottom plate 1714 made of a non-conductive material. The mold can be inserted into the induction heating chamber manually or by a pneumatic cylinder. Copper coil 1715 surround the concentrator 1706 as shown in FIG. 11(c), which is a cross sectional view taken along line 11c—11c of FIG. 11(b). Magnetic flux is concentrated inside of the C-shape of the concentrator and inside the mold.

The magnetic concentrator can be made of silicon-steel laminations and/or ferrite and iron powder composites. A furnace chamber 1705 is installed with a top glass window 1713 and bottom plate 1714 made of a non-conductive material, as well as two pneumatically driven doors 1702 and 1703. The chamber 1705 is connected to a vacuum system 1707 and a gas filling system 1709 to achieve either vacuum conditions, reducing gas atmospheres, or inert gas atmospheres. The induction heating furnace is installed with a charging platform 1701, a pneumatically operated discharging cylinder 1708, and a discharging platform 1704. Temperature is measured by using a pyrometer 1710 which extends through a hole 1711. The hole 1711 extends through the concentrator 1706 and glass window 1713 to the sprue 1716 of the metal body 1712.

Figure 12:
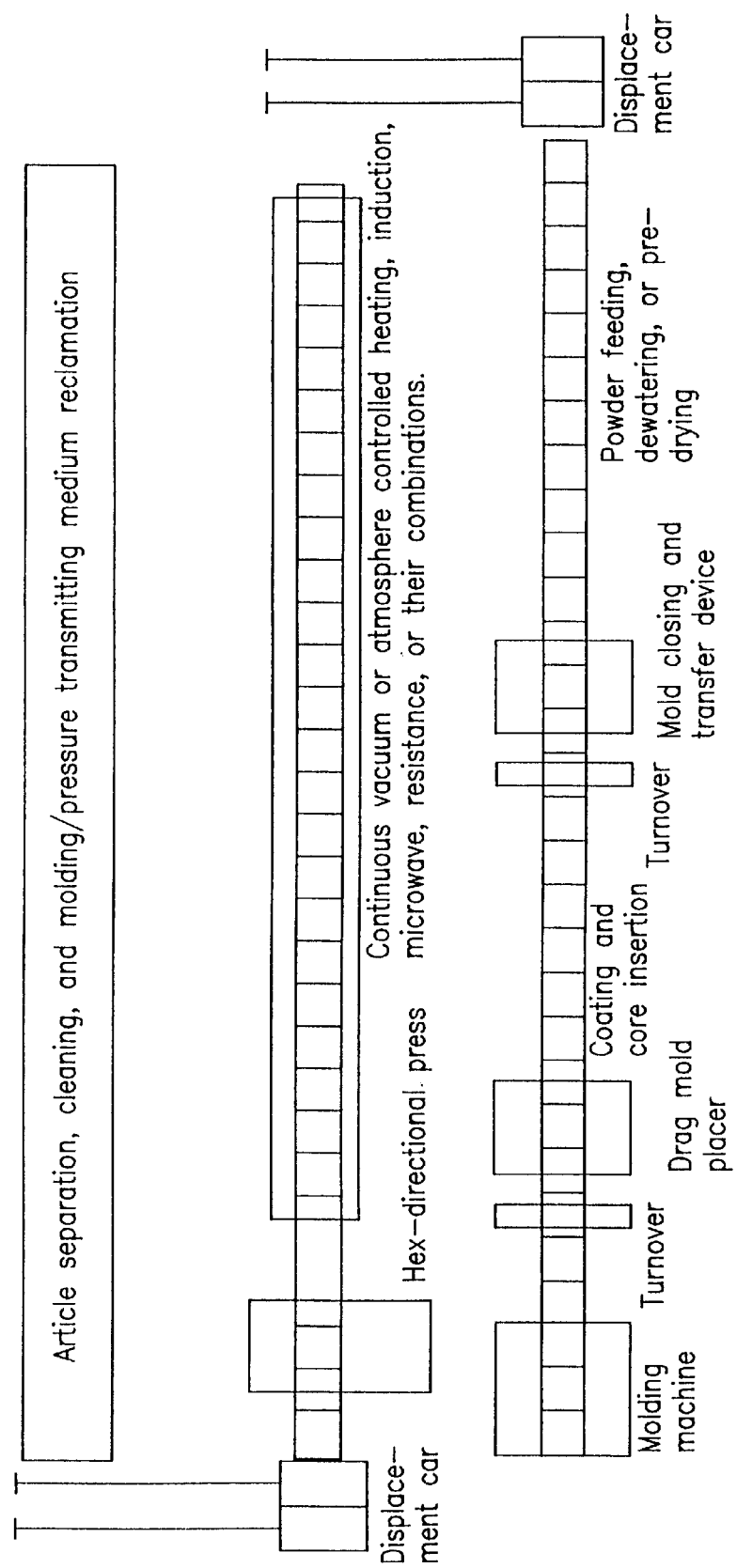
FIG. 12 is a flow diagram showing an automatic production line according to a method of the present invention.

FIG. 12 is a flow chart of an exemplary automatic production line according to the present invention. The production line may produce high quality powder metallurgy components having a complex shape at a rate of more than 180 pieces per hour.

DETAILED DESCRIPTION OF PREFERRED EMBODIMENTS

Figure 1Z:
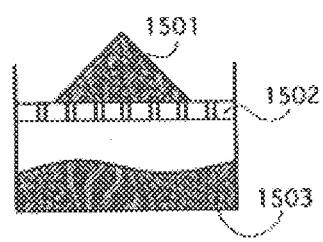

The present method is exemplified above with reference to FIGS. 1(a)–1z). The illustrated method comprises fifteen basic steps. Alternative molding and consolidation methods are also provided for accommodating various article manufacturings. Some of the fifteen steps may not be necessary and some additional steps may be required, depending upon the exact method selected. The following fifteen steps represent one embodiment of the present invention but are not to be construed as limiting the scope of the invention:

1. Patternmaking
2. Selection of molding/pressure transmitting medium including, binder system
3. Mixing
4. Molding
5. Coremaking
6. Coating
7. Implanting and mold closing
8. Powder preparation
9. Powder feeding
10. Degassing/debinding
11. Encapsulation
12. Consolidation
13. Article separation
14. Cleaning and other treatments
15. Molding/pressure transmitting medium reclamation.

A detailed description of each step is given below.

1. Patternmaking

A pattern is used to form the cavity of a mold/pressure transmitting medium. The pattern is surrounded by a molding material which then assumes the inverse shape of the pattern. The pattern may be made of wood, metal, plastic, or composite materials. The selection of a pattern material depends on many factors, such as the number of articles to be produced, the size and shape of the article, the molding and consolidation method to be used, and the dimensional accuracy required.

Sometimes one or more core boxes are needed to make inserts or cores that are placed within a mold cavity to form internal cavities within an article.

Patternmaking begins with determining the dimensions of an article required. Patterns should be oversized to compensate for shrinkage or contraction of the article material during consolidation and cooling, and to compensate for any extra material to be removed from the machined surfaces of the article.

2. Selection of Molding/Pressure Transmitting Medium and Binder System

Ceramic, metallic, intermetallic and graphite particles, or their mixtures, with or without additives, can be used as the mold media. Suitable ceramic particulates include silica, alumina, zircon, olivine, alumino-silicate, zirconia, magnesia, chromite, calcium carbonate, SiC, $Si_3N_4$, BN, and many other oxides, carbides and nitrides as well as their mixtures. Castrite graphite sand is a typical example of graphite particles suitable for use as a molding/pressure transmitting medium. Fly ash, due to its spherical shape, fineness, and ceramic nature, is another candidate as molding/pressure transmitting medium for some applications. Metallic particulates include refractory metals, plus various steel and alloys. Other metallic particulates may find some special usages. A mixture of different materials as a molding/pressure transmitting medium may provide unique properties to facilitate P/M production using the present method. The selection of a molding/pressure transmitting medium depends on many factors such as article materials, shapes, dimensions, surface finishings, molding methods, atmospheres, and consolidation methods. The additives can be organic or inorganic solids or liquids and are used for tailoring the mechanical, physical, electrical and chemical properties or for generating a special function such as controlling the atmosphere. For example, carbon fines and ammonia additives can react with air or decompose upon heating to generate a desired atmosphere surrounding the powdered materials in a mold of pressure transmitting media.

An integrated mold can be formed from the molding/ pressure transmitting media with a binder, by vacuum force or by a magnetic force. The binder can be an organic or inorganic binder with or without additives such as plasticizers and stabilizers. The organic and inorganic binders currently used in the foundry industry are preferred to produce pressure transmitting media and are mentioned in greater detail in Section 4 below. Silicon binders and other binders with good elasticity are also preferred because of their pressure transmitting properties. In some cases, binders and additives currently used in ceramic and metal injection molding are also applicable such as polystyrene, polyethylene, polypropylene, polyvinyl acetate, polymethyl methacrylate, agar, agarose, methylcellulose and wax. Aluminate, phosphate, and silicate based binders may be suitable as well.

According to one embodiment of the invention, preferred particulates include silica sand, graphite sand, zircon sand, chromite sand, calcium carbonate sand, and olivine sand because of their relatively low prices and common uses in foundry applications. According to one embodiment of the invention, preferred binders include sodium silicate systems, furan systems, and urethane systems. According to yet another embodiment of the invention, it is preferable to provide a ratio of between 2 and 20 percent by weight binder based on the weight of particulates.

Requirements for the molding/pressure transmitting media

Particulates used according to the invention serve as molding materials and pressure transmitting media. The particulates may also serve other functions and act as a thermal insulator, thermal reservoir, heater, heat transmitting media, atmosphere control agent, or a sponge body to absorb liquids for fast drying.

Basic desirable qualities to be considered for a mold medium include:

a) Particulate shape, particulate size and size distribution
b) High refractoriness
c) Low volatiles
d) Compatibility with binder system
e) Thermal conductivity
f) Thermal expansion coefficient
g) Electrical properties
h) Mechanical properties at room and elevated temperatures
i) Chemical properties
j) Affordability
k) Availability
l) Reclaimability
m) Environmental friendliness As a molding material, the particulate size and size distribution determines the surface finish of a powdered article. This is because the particulates either directly contact the powders or separate from the powders when used with a thin coating under high pressure. It is desirable to avoid penetration of the mold material and material of the article to be produced. Such penetration causes a rough surface of the article or mechanical sticking. Finer particulates an improve the surface finish. However, finer particulates usually result in poor flowability, which is not desired from a molding point of view. Finer particles also result in high strength after consolidation at an elevated temperature and high pressure, which is not desired from separation point of view. Proper particulate sizes and size distributions can reduce the potential separation and surface roughness problems to a minimum.

To provide a small friction coefficient between particulates, spherical particulates are preferred. High refractoriness is generally desired for elevated temperature consolidations and can contribute to easy separation of articles from particulates and the reuse of the molding media. However, sometimes a glassy phase is preferred at consolidation temperatures to achieve a better isostatic pressing condition resulting from the lubrication function of the glassy phase.

Low volatile materials are desired because (1) they have a stable volume from low to high temperatures, (2) they are capable of having a fast heating rate and/or less degassing time, (3) they provide less contamination to the heating facilities and powdered materials, and (4) they are environmentally favorable. It is critical to get rid of volatiles before encapsulation for en encapsulation consolidation method, and it is also important to control the reaction between the released gases and the powdered materials at elevated temperatures. For example, water vapor caused by the release of crystal water in a molding medium at elevated temperature may readily oxidize the metallic powders in a mold of pressure transmitting medium. In such a case, either fused molding media should be used or carbon particulates should be added to the pressure transmitting media to react with the water vapor and form a reducing atmosphere.

In most cases, the mold of pressure transmitting medium is bonded with a binder to form a strong flaskless mold according to the invention. The strength is required to support the mold weight, prevent scratches, and stand washing and vibrations during wet powder feeding (FIG. 1($r$)) or dry feeding (FIG. 4). The mold medium should be compatible with a selected binder system to obtain good strength.

The whole bodies of pressure transmitting media in the present process are heated to elevated temperatures in furnaces, except when induction or microwave selective heating is used, as described below in Section 12.1.1. Heat is transferred through the mold to the inside powdered material. If the thermal conductivity of the mold is low, extended time is required to heat the inside powdered materials to the desired consolidation temperature. Higher thermal conductivity is desired in this situation. During the transformation of pressure transmitting media from a furnace into a die for compression, heat can be lost to surrounding air or to the die. In order to keep the consolidation temperature of powdered material before or during compaction for longer time, low thermal coefficient materials are desired. The selection of mold medium with low or high thermal conductivity depends on the heating and consolidation methods, article materials, sizes, and other considerations. In some cases, carbon or other materials which can react with air to generate heat can be added into the mold medium to compensate for heat lost during mold transformation.

Materials with lower thermal expansion coefficients are generally preferred as mold medium because they offer better stabilization of the shape and dimensions of the mold during heating. However, there are some cases in which a similar thermal expansion coefficient of the mold and powdered article material is desired to reduce the tendency of thermal stress.

In most cases, electrical conductivity of a mold medium is not a major concern. However, if there is a need to use a mold medium as a heater such as graphite or metal intended to be heated by induction current, directly applied voltage or by microwave heating, then electric properties of the medium are of concern.

Hard and tough materials at room and elevated temperatures are preferred as mold media in many cases to withstand high pressure with limited or no breakage. However, there are some exceptions. From the isostatic pressing point of view, solid particulates may have too much friction between them during their relative movement, which enables them to adjust themselves and introduce a good isostatic pressing condition through one or two compaction directions. Mold medium with good high temperature plasticity may instead be a better choice. Again, the selection depends on the requirements and consolidation method used.

The molding/pressure transmitting media should be chemically inert with powdered materials and encapsulation materials, otherwise a thick isolation coating is needed on the mold cavity surfaces. The media should also be stable at an elevated temperature. However, unstable chemicals may be preferred for some applications. $CaCO_3$ is an abundant and cheap material and it decomposes at about 900° C. in air according to the equation:

$$CaCO_3 \rightarrow CaO + CO_2$$

The resultant CaO has a melting point as high as 2614° C. After consolidation, the CaO mold is very easy to collapse in water or even in air to form CaOH or $CaCO_3$. The stability at room temperature, high refractoriness and easy collapse after decomposition make $CaCO_3$ particulates a very attractive candidate as a molding medium for the ceramic powder consolidations according to the present invention.

Integrated solid as pressure transmitting media

Integrated solids can be used as pressure transmitting media. Generally speaking, solid materials can be classified as elastic, brittle, ductile, and plastic. Elastic materials are capable of large elastic deformation before breakage. Brittle materials have small elastic deformation and no or very little plastic deformation before fracture. Ductile materials can be deformed first elastically and then plastically with strain hardening. Plastic materials have the capability of large plastic deformation without strain hardening when a pressure is applied which is greater than their yield strengths.

A pressure transmitting media as an integrated solid made of particulates and binders may be designed into three types: low strength brittle molds, ductile molds and plastic molds at an elevated temperature, although all the molds may be brittle at room temperature. A low strength brittle mold will be disintegrated when high pressure is applied so that it transfers pressure as loose particulates. A particulate and binder system can be tailored to be a ductile or plastic body at a consolidation temperature with the yield strength high enough to support its own weight, but much lower than the applied pressure. This design of particulate and binder system is feasible, because it is easy to find a ceramic material that has a brittle nature at room temperature, but which is ductile or plastic at an elevated temperature, with the assistance of inorganic binders and other additives. One of the advantages of the present invention is the potential to apply very high pressure. The high pressure readily overcomes the yield strength and deforms the mold body plastically. Good plasticity is useful in establishing an isostatic pressing condition.

3. Mixing

Mold material precursors including particulates, binder and optional additives are charged into mixing equipment in a designed ratio and sequence. The mixing schedule is determined by the type of device used and the particulate and binder system selected. A continuous or a batch type muller is preferred.

The transportation time from the mixing spot to the molding locations, and the storage time after completion of mixing and before molding, is critical to some particulate and binder systems, so they should be carefully controlled.

4. Molding

Molds can be made by any proper hand or machine operations according to the present method, but molding equipment and techniques currently used in the foundry industry are preferred.

The molding processes used in the present invention are classified as expendable mold processes, or permanent mold processes, depending on how many times the mold can be used. The molding processes which are applicable in the present process include heat-cured resin binder processes, cold box resin binder processes, no-bake resin binder processes, silicate and phosphate bonds processes, plaster bond processes, no bond processes, lost foam and REPLI-CAST™ processes, ceramic molding processes, and injection molding processes. Each expendable mold process may have several sub-processes. Permanent molds are also used in the present process although they are quite different from the foundry permanent molds.

In the present process a mold can be made of different particulates in the facing and backing regions of the mold. The advantage is to readily meet the individual requirement and save cost.

Mold of pressure transmitting medium—shape and dimensions

The external shape and dimensions of a mold of pressure transmitting medium according to the present invention must be specially designed and controlled in order to achieve an isostatic pressing condition when pressure is applied from one, two, six or more directions on solid molds. The detailed explanations are given in Section 12 below, where different compaction methods are described.

Molding equipments

Commercial available molding equipment can be utilized with modifications to produce small or large, and single or high volume products. The equipment can be classified as jolt-type, jolt squeeze, sand slinger, high pressure molding, and injection molding machines. The major modifications are to design and manufacture new sets of auxiliary tools and devices which can facilitate molding and handling the special shapes of the flaskless molds of pressure transmitting media.

Metallic and ceramic mold container

Special shapes or conventional shapes of containers may be needed to hold the pressure transmitting media without changing shape after loosing its strength during decomposition of an organic binder, if organic binders are used to bond the particulates together. The container can be made of metals for the encapsulation consolidation method described in Sections 11 and 12.4 below, or made of ceramics, or refractory metals for the other consolidation methods described in Sections 12.1, 12.3 and 12.4 below. The shapes and dimensions should be defined by the individual consolidation method described in Section 12 below. The thickness of the container should be capable of withholding the weight of a mold of pressure transmitting medium according to the invention at an elevated temperature without severe distortion, and deforming readily under high pressure in a die, if mechanical means are used to apply pressure.

Heat-cured resin binder processes

The shell, hot box, warm box, and oven-bake processes are within this category. The shell process is a process in which a mold is formed from pressure transmitting particulates coated with phenolic novolac resins and hexamethylenetetramine. The coated, dry, free-flowing mold particulates are placed against a metal pattern heated at 150° C. to 315° C. for 10 to 30 seconds. The resin curing causes the particulates to adhere to each other, forming a sturdy shell. After the shell has been cured and stripped from the pattern, and any required cores are set, the cope and drag halves of the mold are secured together. The integrated shell mold is placed in a container and backup material is added, and then the mold is ready to be filled with powders.

In the hot and warm box processes, a liquid furan or phenolic binder and a latent acid catalyst are mixed with dry mold medium and fed into a heated box. Upon heating, the catalyst releases acid which induces rapid cure. The resulting mold medium or core is removed within 10 to 30 seconds. After the medium or core is removed from the pattern, the cure is complete as a result of the exothermic chemical reaction and the heat absorbed by the core.

The oven-bake process is used to produce a coated mold medium mix that has green strength. Green strength permits the wet mold medium mix to be blown, hand rammed, or compressed into a simple vented box at room temperature, and to retain its shape when removed from the pattern. The uncured molds are placed on a supporting plate for oven drying. Linseed or vegetable oil are the largest volume used binders. Urea formaldehyde and resole phenolic resins are also used. Mold medium mixes generally contain 1% or less cereal, and small amounts of bentonite to improve the green strength.

Cold box resin binder processes

In a cold box process, a mold medium and binder mixture is cured at room temperature by a vapor or gas catalyst which penetrates into the mixture. The commonly used binder and catalyst systems for a cold box process include phenolic urethane and triethylamine or dimethylethylamine systems, furan and acrylic epoxy and sulfur dioxide systems, ester-cured alkaline phenolic and methyl formate systems, and silicate and carbon dioxide systems.

No-bake resin binder processes

In a no-bake resin binder process, two or more binder components are mixed with mold particulates. The mixture can cure when at room temperature from a few minutes to several hours depending on the binder system used, the curing agent and amount used, the particulate type, and temperature. The common no-bake binder systems include furan acid catalyzed no-bake, phenolic acid catalyzed no-bake, ester-cured alkaline phenolic no-bake, silicate/ester-catalyzed no-bake, oil urethane no-bake, phenolic urethane no-bake, polyol-isocyanide no-bake, and alumina-phosphate no-bake.

Silicate and phosphate bonds

This category covers the clay-water bond, colloidal silica bonds, ethyl silicate bond, sodium silicate bond, liquid phosphate bond, the Shaw™ process, and the Unicast™ process.

Plaster bonds

Plaster molding can be used for low temperature consolidation of powders. There are four alternatives under this category: conventional plaster mold, match plate pattern plaster mold, the ANTIOCH™ process, and the foamed plaster process. The major mold ingredient is calcium sulfate. Other materials used to enhance properties such as green and dry strength and permeability include cement, ceramic talc, fiberglass, sand, clay, wollastanite, pearlite, and fly ash.

Lost foam molding and REPLICAST™ molding

Lost foam molding or REPLICAST™ techniques are also applicable to shape powdered articles if some modifications can be made. In the present process, the expanded polystyrene (EPS) foam pattern having a ceramic coating is produced and imbedded in mold particulates bonded by an inorganic binder. A burn out is conducted to remove the EPS pattern, strengthen the ceramic shell formed from the ceramic coating, and leave a cavity for powders to be fed. The foam pattern should be burned out in an air furnace. The inorganic binder is capable of keeping the shape of a cavity after the foam pattern is gone.

Vacuum molding

Vacuum molding is an unique way to produce a mold of pressure transmitting medium. In this molding process, molding/pressure transmitting particulates are packed with thin plastic films and vacuum is introduced into the particulates to form a mold. The strength and shape of the mold after the mold is stripped from a pattern are gained and remained by a vacuum acting on the outer surfaces through the plastic films. The shape of a cavity in a vacuum mold is obtained by placing one plastic film over a specially designed pattern and starting vacuum. The outer shape of a vacuum mold is obtained by using a frame having an internal shape which is the same as the outer shape of the vacuum mold which is to be produced.

Ceramic molding

Ceramic molding processes which can be applied in the present invention can be divided at least into those using the Shaw™ process and those using the Unicast™ process. There are also two alternatives in the Shaw™ process: the Shaw™ all-ceramic mold process and the Shaw™ composite mold process.

In the Shaw™ all-ceramic mold process, ceramic powders, silicate binder and a gelling agent are mixed together to produce a creamy slurry. The slurry is poured over a pattern and gels within a few minutes. The gelled ceramic mold with the replicate face is then separated from the pattern. Moisture in the mold is driven off by burning and baking.

In the Shaw™ composite molding process, a preform pattern and a finish pattern are required. The preform pattern is similar to the finish pattern in shape and just oversized by a few millimeters on all surfaces relative to the finish pattern. The preform pattern is used to generate a cope or drag with an oversized cavity by surrounding a mixture of mold particulates and a binder over it. The particulate and binder system can be almost any kind, as mentioned in Section 2 and in the earlier part of this section, depending on applications. The preform pattern is stripped from the mold medium after it is cured. The finish pattern is used to replace the position of the preform pattern and the mold medium is put back to cover it. There should be a gap of a few millimeters between the finish pattern and the mold cavity. A ceramic slurry is poured into the gaps to form a ceramic face. The finish pattern is then stripped, and the mold with the ceramic face is burned for drying.

The Unicast™ process is similar to the Shaw™ process except for two differences. First, in the Unicast™ process, liquids are used instead of burning to treat a gelled ceramic mold for mold stabilization, and second, a ceramic facing slurry is applied on the pattern and then the backing mixture of a mold medium and a binder is charged over it. After the curing of the binder, the composite mold medium is stripped from the pattern.

Permanent molding

A permanent mold can be used many times to produce articles with the same shape and dimension and thus is economically favorable. In the production of articles with the structure of no shrinkage restriction such as 419 in FIG. 5(*c*), permanent molds can be formed using the consolidation methods described in Sections 12.3 and 12.4 below. The permanent molds are different from those currently used in the foundry industry. The permanent molds in the present process are made of ceramic or metallic molding materials with inorganic binders. Such a mold with powder to be consolidated inside is heated in a furnace during the entire consolidation process. The permanent molds must be capable of standing high temperatures and thermal fatigue.

5. Coremaking

The cold box process, heat-cured process and no-bake process can all be used for coremaking. Injection molding is another process available for coremaking with the specialty of high dimension accuracies. In some cases, the same material used for making an article is used for coremaking in order to achieve the same shrinkage rate.

6. Coating

In most cases, various coatings are required to be applied on the pressure transmitting media and cores to prevent reaction between powders and surrounding molding and coremaking materials. Another purpose is to prevent the penetration of fine powders into the gaps between molding or coremaking particulates, resulting in particulate and powder sticking.

Five components are the most commonly used for preparing a coating slurry: coating material, carrier system, suspension system, binder system, and chemical modifiers. The coating materials can be carbon, BN, alumina, silica, zirconia, magnesia, zircon, chromite, SiC, SiN and other oxide, carbide and nitride materials. Refractory metals are also suitable for coating materials.

Coatings can be applied by spraying, brushing, dipping and pouring. Coatings of multilayered similar materials or multilayered dissimilar materials are also applicable, if desired.

Articles with functional coatings can be manufactured using the present process in a unique way. There are many applications requiring different surface and bulk properties of an article, which promote the development of many coating technologies such as thermal spray coating, plasma spray coating, physical vapor deposition, chemical vapor deposition, and so on. Each coating has advantages and disadvantages. For example, thermal spray and plasma spray produce coatings with high porosity, but CVD is a fairly slow process. In the present process, a slurry containing the desired coating material can be applied on the internal surface of a mold of pressure transmitting medium and on the outer surface of a core. Powder fed into the cavity of the mold can bond with the coating material at elevated temperature and under high pressure, which make the bonding of the coating material strong and fully, dense. The coating can be thin or thick, overall or regional, single or multicomponent, and single or multilayered. The purpose of using multiple layers is to introduce intermediate coatings to coordinate larger property differences between the outer layer and the bulk material, or to produce gradient materials. In order to reduce the potential sticking of the functional coatings with the mold of pressure transmitting medium, and increase the bonding between the article and the functional coating, an isolation coating should be inserted between the mold and the functional coating. Another coating application is to conduct nitriding, carbonizating, and carbon nitriding on the article surface by reaction between the article material and the selected coating material.

A preform produced by other shaping processes can be coated according to the present process as well. A slurry with coating material and a binder is applied to the preform. A mixture of particulates and a binder surrounds the preform and cures. Hot isostatic pressure can be applied in the way described in Section 12 below to bond the coating material on the preform.

7. Implanting and mold closing

Before closing a multi-part mold, cores and other implants, if any, should be inserted and positioned in the molds. The other implants include any solid or powdered metal, graphite or ceramic pieces for a surface finish and dimension control, for homogeneous shrinkage control, and for a selective heating purpose. Other implants also include metal or ceramic preforms for diffusion bonding and manufacturing hybrid material articles; and fiber preforms for manufacturing fiber reinforced composite articles.

The surface finish and dimensional accuracy of a powdered article depends on the surface smoothness and dimension accuracy of the mold and core which the powders are pressed against during a consolidation process. The features of the mold according to the invention will enable it to shrink during a consolidation process, which results in the dimension change of a powdered article. In order to improve regional surface finish and dimensional accuracies, metal or ceramic pieces with a good surface finish and accurate dimensions can be inserted in some desired locations of a mold. The dimensions and smoothness of the inserted solid pieces basically remain unchanged during consolidation. Therefore, the regional surface finish and dimensional accuracy can be improved.

Diffusion bonding is a common technique to bond materials together to produce specially structured articles, or to bond dissimilar materials together to produce special hybrid articles. High temperatures and pressure are required for a diffusion bonding process. The present technique not only provides the required high temperature and pressure, but also provides the feasibility to bond a solid to a solid, a solid to powder, powder to powder, and two or more different components at the same time. This technique also provides an easy way to bond components with various shapes and dimensions at almost any location and angle which would otherwise be difficult if not impossible to achieve using almost all other bonding techniques.

The molds can be assembled tight and strong using a binder or mechanical means so as to withstand vibration during powder feeding and other handling during a consolidation process.

8. Powders and Preparations

Theoretically, all types of powders currently used for producing PM metallic, composite, and ceramic articles are suitable to be used in the present invention. The feature of powder feeding into a mold cavity and the capability of retaining shape without a binder or mechanical interlock between powders give the present process wide application. A powder or mixture of powders can also be selected to synthesize special materials by a mold in-situ reaction sintering between powder particles, or between powder particles using a controlled atmosphere during heating.

Fine powders are required in most cases not only for desired microstructure, but also for higher green and dry strengths to facilitate holdings and better sinterability. For example, metal injection molding requires less than 15 $\mu$m powders instead of a common 50 $\mu$m. Finer powders are always more expensive.

In the present process, the shape and weight of a powdered packing is retained and supported by the surrounding solid mold media during the entire shape forming and consolidation process until it becomes a solid and strong article. Both fine and coarse powders are workable in this process.

High packing density and good flowability are important to reduce sintering shrinkage, reduce defects, and obtain accurate dimensions and shapes. Spherical powders are preferred for dry powder feeding because they offer better flowability and higher packing density. The highest packing density of monospheres is 64%, and bimodal spheres with the diameter ratio over 7 composed of 60–65 wt % coarse and 35–40 wt % fine particles can reach 75%. Controlled multimodal size distribution can even increase the packing density exceeding 80%. In order to obtain higher packing density, bimodal or multimodal size distribution should be used.

Non-monosized powders and more than one phase such as powders with whiskers for reinforcement should be completely mixed before loading, using an appropriate mixing facility.

Metallic and ceramic powders, or their mixtures, can also be mixed with liquids for wet feeding. A liquid may be composed of other additives such as viscosity modifiers, binders, plasticizers, coupling agents, deflocculants, coagulants, foaming agents, antifoaming agents, and lubricants. The liquids can be water, mineral oils, vegetable oils or organic solutions such as kerosine, gasoline, or alcohol. The rheological properties of a slurry are important characteristics. It is desirable to obtain a high loading of solid particulates with low viscosity. The purpose of adding a binder, plasticizer and coupling agent is to provide strength and plasticity to overcome the internal stress after the liquid has vaporized. A viscosity modifier may be used to control the viscosity of a slurry and the settling of particulates. Deflocculants and coagulants may be used to control the viscosity, solid loading capability, and packing defects. Foaming and antifoaming agents may be used to eliminate bubbles in a slurry or to form a sponge article. Lubricant may be used for improving flowability.

Most ceramic powders are light in weight and fine in size when compared to metal powders. These characteristics make ceramic powders difficult to feed into a mold in dry form, at least in a manner to achieve a high degree of packing density. If dry feeding is required for a ceramic powder, then a spray dryer would be an ideal equipment to make spherical agglomerates of ceramic powders, which have good flowability and a dense packing structure inside of agglomerates.

9. Powder feeding

Powder dry or wet feeding can be used to fill a cavity of a mold according to the invention. If dry powders are used, the powders should be poured or blowed into a cavity through one or several spruces depending on the structure of a cavity. A mechanical vibrator and/or tapping is required to assist the flow of powders and increase the packing density. If wet feeding is used, the powder paste or slurry should be charged into a pressure injection device or machine. The powders are injected under pressure into a cavity through a gate by top, bottom or any other position injection. Air in the cavity should be forced out through one or several fine venting holes. The gate position, shape, and dimension should be carefully designed. The injection pressure, injection rate, velocity, holding pressure, and time should be controlled in order to obtain the best result. Cold or hot compressed air can be utilized to facilitate de-liquidizing and drying.

10. Degassing and debinding

A mold of pressure transmitting medium according to the invention, with powder loaded inside, may contain volatiles which have been added into the pressure transmitting medium or powder for various purposes. Such volatiles include organic binder, inorganic binder, water, organic solution, oil, and other additives. Volatiles may also be naturally contained, such as $CO_2$ released after decomposition of carbonates, crystal water, and gases absorbed on particulate surfaces. These volatiles need to be removed before the mold is encapsulated, or else they may be released while the mold is heated up to a consolidation temperature, posing a risk of explosion. Some volatiles can be removed by drying in air at low temperature. Volatiles such as water and solutions with low boiling points can be removed this way but most volatiles are removed by heating to above room temperature, with or without holding.

There are two types of binding which differ according to the strength of a mold after degassing/debinding: low strength—unable to support itself; and high strength—able to support itself with or without limited distortion. In the first case, such as when using an organic binder, a container is required to hold the mold during the degassing/debinding process. The shape of the mold and its cavity can remain intact as does the shape of the powdered article, although the mold strength has been lost becoming a loose packing of particulates after the organic binder is removed by heating.

If the content of volatiles is high, the heating rate should be low at a critical temperature range in order to prevent boiling and sharp shrinkage caused by the rapid removal of the volatiles. Boiling and sharp shrinkage may reduce the mold strength, damage its shape and dimensions, cause cracks in both the mold and article, and contaminate the powders.

Degassing and debinding can be conducted in a gas, oil, resistance, induction, or microwave furnace, and in air, vacuum or inert gas atmosphere, at appropriate temperatures and pressures.

11. Encapsulation

A mold of pressure transmitting medium filled with powders may require canning, depending on the consolidation methods described in section 12 below. The function of a can is to provide isostatic compaction pressure to powders inside when a gas, liquid or solid pressure transmitting media is applied on its outside surfaces. For consolidations at lower temperatures, metallic materials can be used for encapsulation. For consolidations at a higher temperature, quartz can be used. The shape, wall thickness, air tightness, mechanical, and other properties should be controlled.

12. Consolidation

There are five particular consolidation methods according to the present invention. The methods accommodate manufacturing various articles from different materials, and using different equipment to meet various requirements.

12.1. Consolidation in a die under a press or hammer

In this method, a mold of pressure transmitting medium with powder filled in its cavity is heated in a furnace, and after a desired holding time at a required temperature, the mold is quickly transferred from the furnace into a special die placed under a press or hammer. Pressure is applied on the mold by moving the punch or punches, or the hammer head, against the mold. After a certain holding time or number of impacts, the mold is ejected out of the die to produce a zero or near zero porosity article.

Molds with special external shapes and preforms inside formed by other processes can also be consolidated in a die under a press or hammer.

12.1.1. Furnaces

Vacuum furnaces, inert or reducing gas atmosphere furnaces, or air furnaces, depending on the powdered materials and maximum heating temperature, can be used to heat the mold with powders inside. A reducing atmosphere can be achieved by filling or continuously passing-through a reducing gas, by injecting a liquid, by placing a solid material in the furnace, or by covering the mold with a solid material. Liquid or solid material that readily decomposes at a desired temperature range, or reacts with oxygen in the furnace, may form a reducing atmosphere. Many suitable materials are hydrocarbons. Ammonia is one of the most common liquids used for this purpose.

The furnace can be a gas, oil, resistance, induction, microwave, or a combination heating furnace, depending on the powdered material, article size, quantity, temperature, atmosphere, heating rate, and availability.

Induction heating is especially useful for selective heating, if the powder is of a metal material. In such case, metal powders after treatment can be quickly heated to the consolidation temperature while the mold remains at lower temperature and thus functions as a thermal insulator. The advantages of the selective heating include energy savings, fast heating, lower requirements for pressing dies and punches, lower requirements for molding media, and easy operation. Locally focused heating can also be achieved by induction heating metal or graphite pieces placed in the desired regions of a mold according to some applications, such as diffusion bonding. Microwave energy may be applied to achieve a selective heating for both metallic and non-metallic materials.

12.1.2. Special dies and pressing

Special dies are required to achieve a pseudo-isostatic pressing condition by using an integrated mold as a pressure transmitting medium. Three types of dies described below can be used to achieve this purpose.

12.1.2.1. Single taper die and pressing

FIGS. 1($t$), 1($u$) and 6 show a typical structure of a single taper die. There are two ways to apply force on a mold of pressure transmitting medium: unidirectional pressing; and bidirectional pressing. However, the basic structures of the dies are the same.

The die has a cavity with three sections (FIGS. 1($t$) and 6), a large hole in the upper body of the die for inserting a mold of pressure transmitting medium and guiding the upper punch, a taper section in the middle for providing a side force on the mold when a pressure is applied on the top surface of the mold, and a smaller hole in the lower body of the die for holding a specially shaped cushion and guiding the lower punch.

Figure 6:
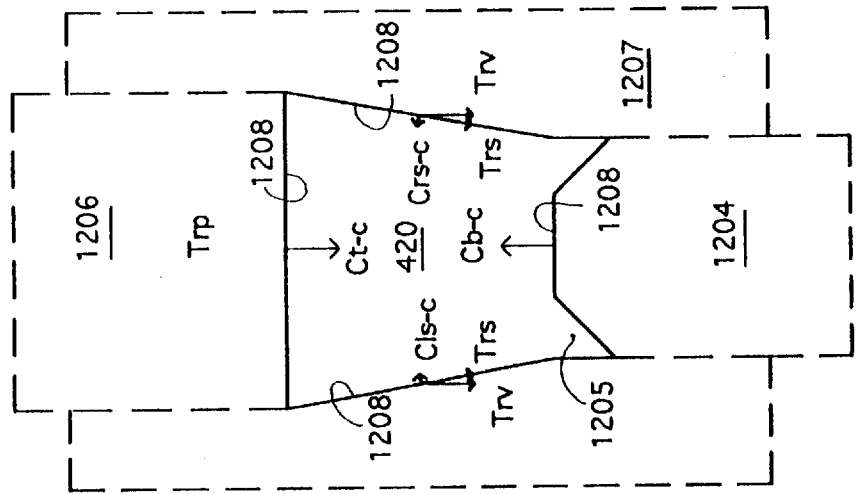
FIGS. 6(a)–(b) illustrate a mold according to the present invention before and after a compaction process showing the relative compaction vectors resulting from the process.
Figure 6:
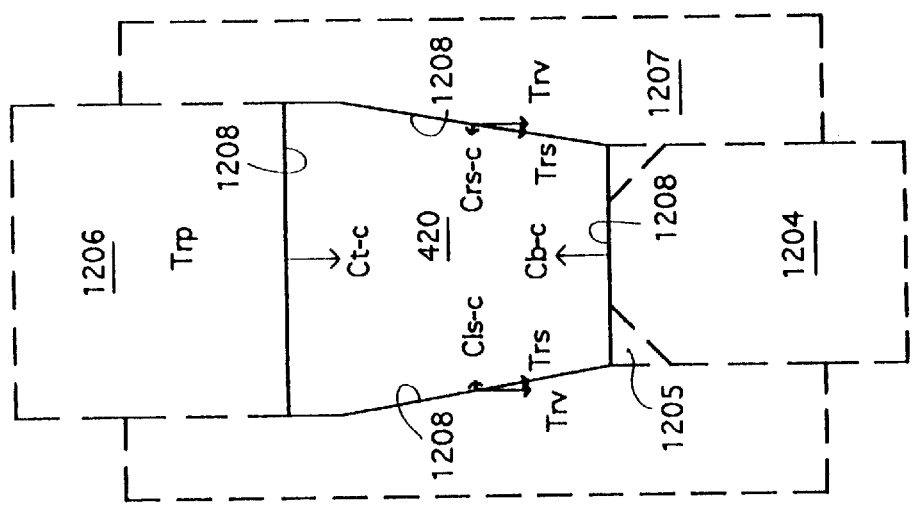

The principle to achieve homogeneous contraction is illustrated by FIG. 6. When a mold of pressure transmitting medium is forced down by the upper punch, a side force and a bottom force are introduced against the mold. Assuming a perfect lubrication between the mold and the tapered side surface of the die, and homogeneous contraction along the vertical direction, the vertical contraction rate is expressed as:

$$C_v = C_{t-b}/h$$

where $C_v\%$: vertical contraction rate;

$C_{t-b}$: contraction from the top to the bottom of the mold of pressure transmitting medium; and h: initial height of the mold.

The whole body or the center of the mold should be able to travel down a distance, $Tr_v$, which depends on the yield strength of the mold, mold size, mold shape, and mold compressibility, and on the shape and dimensions of the object 1205 (FIG. 6). The transversal contraction of the mold can be calculated based on the relationship between the travel distance and the taper angle.

$$C_{ls-c} = Tr_v \times \sin \alpha$$

$$C_{rs-c} = Tr_v \times \sin \alpha$$

$$C_{ti}\% = 2C_{ls-c}/D_i = 2 \times Tr_v \times \sin \alpha/D_i$$

where $C_{ls-c}$: contraction of the left side surface to the center of the mold of pressure transmitting medium;

$Cr_{rs-c}$: contraction of the right side surface to the center of the mold of pressure transmitting medium;

$C_{ti}\%$: transversal contraction rate at the cross section with diameter of $D_i$;

$Tr_v$: vertical travel distance;

$\alpha$: half taper angle; and $D_i$: taper cavity diameter at i cross section.

It is possible to design a die to achieve similar transversal and vertical contraction rates. A curve is better than a straight line for the side profile according to some embodiments.

A proper design of a die cavity shape should include a consideration of the effects of the mold size and compressibility, the article size, and the shrinkage rate.

2.1.2.1.1. Unidirectional pressing

In unidirectional pressing, the bottom cushion plays an important role to achieve a pseudo-isostatic pressing on the body of the mold. The shape of the cushion is designed to provide space for a portion of the molding material to flow in, under pressure, in order to compact the mold of pressure transmitting medium more homogeneously. Without the space, the mold will just shrink vertically, but if the space is too large, the shape of the article cannot be maintained.

12.1.2.1.2. Bidirectional pressing

Another way to achieve a homogenous isostatic pressing is to press the mold by a bidirectional pressing. The top punch moves down to force the mold of pressure transmitting medium down. Shrinking is confined by the top punch, side wall of the die, and bottom punch, while the bottom punch is also moving down to support the bottom portion of the mold and to provide space to allow the mold to travel down. The moving rate of the bottom punch is slower than that of the top punch to provide pressure to compact the bottom portion of the mold at a similar rate as compaction at the top portion of the mold. The top and bottom punches of the bidirectional pressing are preferably controlled by a computer program based on the geometry, size and compressibility of the mold.

12.1.2.2. Double taper die and pressing

The die for bidirectional pressing can also be designed in the way illustrated in FIG. 7. The mold of pressure transmitting medium is shaped in three portions: two truncated cones, one each on the top and on the bottom, and a short cylinder in the middle. The ends of the top and bottom punches look like a bowl with a circle channel for material to flow in. The profile of the bowl can be curved based on the calculation to provide a better homogeneous compaction. During compaction, the top and bottom punches are moved down and up, respectively, at the same rate. The top and bottom portions of the mold are shrunk in a similar way as that in the single taper die using unidirectionally pressing. The middle portion of the mold is shrunk by moving down the curves of the bowls at the ends of the top and bottom punches.

A better pseudo-isostatic pressing can be achieved by using a special pressing system illustrated in FIG. 7($b$), 7($c$) and 7($d$).

12.1.2.3. Multidirectional pressing, molds and dies

A mold of pressure transmitting medium can be made into a special shape and pressed multidirectionally in a special pressing system to achieve a better pseudo-isostatic pressing condition. A typical hex-directional pressing system is illustrated in FIGS. 8($a$) and 8($b$).

The six punches in the hex-directional pressing system can be symmetrically or asymmetrically arranged, and the molds of pressure transmitting media can be a cubic, tetragonal or orthorhombic shape with or without six short arms. The arms can have cross sections which may be square, rectangular, circular, elliptical, or polygonal. The tetragonal or orthorhombic molds are used for high aspect ratio part consolidations such as bars and sheets. Embodiments using six punches, or three pairs of punches, can have the punches move at the same speed or at different speeds, depending on the shape of the mold in order to achieve the same compaction rate in each direction. The system can be constructed having charging and discharging ports from any direction.

12.1.2.4. Dies with heating

Dies can be structured with a heating source to maintain a high temperature for a certain period of time under pressure. Induction heating is one example of a heating means. The die is a hybrid structure: a metal shell with water cooling and a ceramic lining with an embedded induction coil. The alternate current flowing through the coil heats the metallic material in the mold.

12.1.2.5. Die coating/lubricant

A lubricant coating is preferably applied on the internal surfaces of the dies and the surfaces of the punches and cushions to provide lubrication and thermal insulation. The coating is important to achieve pseudo-isostatic pressing, reduce thermal loss of a mold before completion of consolidation, and extend the useful lives of the dies and punches. Boron nitride, graphite, mica, talc, chalk, fireclay, metal oxides, diatomaceous earth, soapstone and vermiculite are common coating materials which can be applied by spraying a slurry made of at least one of these material powders and carrying liquids and binders.

12.2. Consolidation with encapsulation

A mold of pressure transmitting medium can be encapsulated by using a metal or quartz material to maintain a vacuum inside of the can after debinding and degassing of the mold. The can with the mold and powder inside can be consolidated in a conventional HIP unit or a pressure sintering furnace (low pressure) using a gas as a pressure transmitting media, or a rapid omnidirectional compaction unit using a liquid as a pressure transmitting media, or in another unit using solid particulates as a pressure transmitting medium.

12.3. Consolidation without encapsulation

In this consolidation alternative, particulate molds without encapsulation are consolidated by using a vacuum/pressure sintering furnace, a conventional HIP unit, a rapid omnidirectional compaction (ROC) unit, a Ceracon™ unit, a vacuum furnace, an inert gas protection furnace, or an air furnace.

A vacuum/pressure sintering furnace and many HIP units are of the type which can be operated in vacuum mode or gas pressurizing mode, and switched between the two modes during a run.

In an over pressure sintering furnace or an HIP unit, powders in a particulate mold are first sintered in vacuum mode to close porosity (about 95% relative density, that is, measured density divided by theoretical density), and then gas pressure is applied. Because the porosity of the article is closed, although it is not fully dense, gas pressure is able to be applied on the outer surfaces of the article to consolidate it under a high pressure and temperature.

If an ROC unit is used, it may not be necessary to first sinter the article to close porosity if the viscose liquid pressure transmitting medium is not capable of penetrating the very fine pores. A particulate mold is sintered up to a desired temperature and held for a predetermined time in a furnace, and then transferred into the metal pot in the ROC unit. The preheated viscose liquid pressure transmitting media is poured into the pot and pressure is applied by forcing a punch down on the top surface of the liquid pressure transmitting media.

If a Ceracon™ unit is used, it is not necessary to first sinter the article to close porosity and then apply pressure. A particulate mold is sintered to a desired temperature and held for a pre-determined time in a furnace, and transferred into the metal pot in the Ceracon™ unit. Pre-heated particulates are poured into the die and pressure is applied by forcing a punch down from the above position of the die using a hydraulic press. The solid particulates transfer the pressure to the particulate mold and then to the article body.

If a vacuum furnace, an inert gas protection furnace, or an air furnace is used, the molds with powdered materials inside are simply sintered to the desired temperatures and held for the desired times. Because of the support from the molds, sintering temperatures can be higher without significant sintering distortions of articles in order to achieve zero or near zero porosity.

Metallic materials can also be melted and solidified in the molds to produce articles. In this alternative, a mold made of a particulate and binder mixture with metallic powders or beads in its cavity is heated over the melting point of the metallic powders, and then the molten metal solidifies to form an article. The metal powders or beads can be a single material with the desired composition, or can be composed of several materials to make up the desired composition. A vacuum or inert gas protection furnace is used to consolidate articles according to this embodiment. If a pressure sintering furnace is used, pressure can be applied during the solidification process to reduce casting porosity.

12.4. Consolidation in hot press with a graphite, BN, refractory metal die

A hot press is structured with one hydraulic top punch, or a combination of a top punch and a bottom punch, enclosed in a water cooled metal chamber. A vacuum or inert gas atmosphere can be provided in the chamber. A cylindrical graphite die with a hole is used to contain powders in the middle of the hole. The two ends of the hole are plunged with two graphite bars. The powders are compressed by forcing the graphite bars to move toward each other, relatively, under a single or double hydraulic punch at an elevated temperature. The graphite die is heated by induction or resistance heating elements. The maximum pressure applied to the article is limited by the strength of the graphite material, usually less than 5,000 psi.

According to this embodiment, a mold is produced with the desired external surface and interior cavity and the cavity is filled with a powdered material. The mold is placed into a graphite, BN or refractory metal die and compressed in a hot press. The external surface of the mold and the internal surface of the die should be designed in a way to achieve pseudo-isostatic pressing conditions as described in Sections 12.1.2.1.1., 12.1.2.1.2, and 12.1.2.2. The mold can be made of ceramic, metallic, or graphite particulate. A lubrication or isolation coating should be applied on the inside surface of the die.

12.5 Preform consolidations

Preforms produced by metal casting, metal or ceramic injection molding, or any other processes to shape powdered materials to less than full density can be pseudo-isostatically compressed to increase their densities. The preforms can be surrounded by a mixture of particulates and an inorganic binder, forming molds with the required external geometries as described in Sections 12.1.2.1, 12.1.2.2, and 12.1.2.3. The molds are preheated in a furnace to desired temperatures and held for desired times, and quickly transferred into a special die and compressed pseudo-isostatically by a unidirectional, bidirectional or multidirectional pressing system as described in Sections 12.1.2.1, 12.1.2.2, and 12.1.2.3.

The preforms can also be compressed pseudo-isostatically in the special compressing systems illustrated in FIGS. 7(b), 7(c), 7(d), and FIG. 8, by disposing preheated loose particulates around preheated preforms in the special dies.

Metal castings can also be compressed pseudo-isostatically soon after pouring liquid metal into a sand mold. A hex-directional pressing system is positioned at the end of the pouring station in a foundry plant. At an appropriate solidification stage of a metal casting, whether completely solidified or partially solidified, the sand mold with the metal casting inside is charged into the hex-directional pressing system, pressed and discharged. The sand mold should have the required external surface and no flask before pressing.

13. Article Separation

After consolidation, the produced articles need to be separated from the mold. In the case of encapsulation with a metal or glass can, the can may be opened or broken by cutting, impacting or any other appropriate ways. The selected separation method depends on the articles and the mold materials.

If an article is made of ductile material such as metals and metal alloys, the separation can be made with available core knockout, shot blasting, and shakeout equipment.

If an article is made of brittle material such as ceramics, the mold should be composed of a graphite particulate, BN particulate, calcium carbonate particulate, or mixtures of these components, which are soft for mechanical removal after consolidation, or easy to collapse by some other means. For example, a graphite mold can be burned in air to such a degree as to lose strength. Calcium oxide molds (derived from the decomposition of calcium carbonate while subjected to high temperature) can collapse in water or in air through the reaction mentioned in Section 2 above.

14. Cleaning and Other Treatments

After separation of an article from a mold according to the invention, gates, flashes and risers, if any are used, should be removed by knocking, cutting, grinding or any other appropriate means. Heat treatment, machining, inspection and other treatments can be performed according to the requirements of the resultant article.

15. Molding/Pressure Transmitting Medium Reclamation

Depending on the mold medium, the binder system employed, and the consolidation method applied, reclamation methods can be very different and difficult. A mold medium system using an organic binder can be reclaimed by removing broken fine particulates from cushioning coarse agglomerates formed by particulate bonding under high pressure and temperature. A mold medium system using an inorganic binder can be reclaimed by crushing agglomerates and reclassification. A metallic mold medium can be remelted. Mold media unable to be reclaimed can be utilized in other applications such as to burn as fuel for a graphite medium, to pave road bases, or to replace aggregates in concrete for ceramic media.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A hex-directional press comprising, a die body having a central cavity for receiving a mold of pressure transmitting medium therein, said die body having six passages formed therein in communication with said cavity, a punch including an inner end being slidably mounted in each of said passages for movement toward and away from said cavity, a cylinder connected to each of said punches for moving said punches toward and away from said cavity, one of said cylinders being slidably supported for movement toward and away from said die body such that the inner end of the associated punch can be spaced from said die body so that said mold of pressure transmitting medium can be positioned between the inner end of said associated punch and the associated passage, and an auxiliary cylinder connected to said one cylinder for slidably moving said one cylinder, whereby when said auxiliary cylinder moves said one cylinder inwardly said mold is moved through said associated passage and into said cavity.

* * * * *